US009947277B2

(12) United States Patent
Tann et al.

(10) Patent No.: US 9,947,277 B2
(45) Date of Patent: Apr. 17, 2018

(54) DEVICES AND METHODS FOR OPERATING A TIMING CONTROLLER OF A DISPLAY

(71) Applicant: APPLE INC., Cupertino, CA (US)

(72) Inventors: Christopher P. Tann, San Jose, CA (US); Sandro H. Pintz, Menlo Park, CA (US); Satish S. Iyengar, Saratoga, CA (US); David S. Zalatimo, San Jose, CA (US)

(73) Assignee: APPLE INC., Cupertino, CA (US)

( * ) Notice: Subject to any disclaimer, the term of this patent is extended or adjusted under 35 U.S.C. 154(b) by 70 days.

(21) Appl. No.: 14/717,557

(22) Filed: May 20, 2015

(65) Prior Publication Data

US 2016/0343320 A1    Nov. 24, 2016

(51) Int. Cl.
  *G09G 3/36* (2006.01)
  *G09G 5/12* (2006.01)
  *G06F 1/32* (2006.01)
  *G09G 5/00* (2006.01)

(52) U.S. Cl.
  CPC ......... *G09G 3/3618* (2013.01); *G06F 1/3265* (2013.01); *G09G 5/001* (2013.01); *G09G 5/006* (2013.01); *G09G 5/12* (2013.01); *G09G 3/3611* (2013.01); *G09G 2310/0291* (2013.01); *G09G 2310/08* (2013.01); *G09G 2330/021* (2013.01); *G09G 2360/18* (2013.01)

(58) Field of Classification Search
  CPC ......... G09G 2360/18; G09G 2330/021; G09G 3/2092–3/2096; G09G 5/001; G09G 5/003; G09G 5/005; G09G 5/006; G09G 5/395; G09G 5/399; G06F 1/3203
  See application file for complete search history.

(56) References Cited

U.S. PATENT DOCUMENTS

| 6,489,964 | B1 | 12/2002 | Van Asma | |
| 7,492,369 | B2* | 2/2009 | Booth, Jr. | G09G 5/393 |
| | | | | 345/536 |
| 8,775,839 | B2 | 7/2014 | Cousson et al. | |
| 8,810,589 | B1* | 8/2014 | Khoury | G09G 5/395 |
| | | | | 345/531 |
| 8,884,977 | B2 | 11/2014 | Wang | |
| 9,165,537 | B2* | 10/2015 | Wyatt | G09G 5/395 |

(Continued)

FOREIGN PATENT DOCUMENTS

GB    2356314 A    5/2001

OTHER PUBLICATIONS

International Search Report and Written Opinion for PCT Application No. PCT/US2016/031011 dated Jul. 22, 2016; 12 pgs.

*Primary Examiner* — Xuemei Zheng
(74) *Attorney, Agent, or Firm* — Fletcher Yoder PC

(57) ABSTRACT

Methods and devices for reducing the power consumption of a frame buffer and timing controller of an electronic display are provided. By way of example, a method of operating an electronic display includes receiving image data from a processor of the electronic display, storing the image data to a buffer of the electronic display, reading the image data from the buffer to supply the image data to a column driver of the electronic display, determining whether an amount of image data stored in buffer is less than a threshold, and switching from reading the image data from the buffer to reading the image data directly from the processor when the amount of image data stored in buffer is less than the threshold.

22 Claims, 7 Drawing Sheets

(56) References Cited

U.S. PATENT DOCUMENTS

| | | | |
|---|---|---|---|
| 2006/0259804 A1* | 11/2006 | Fry | G06F 1/3225 713/324 |
| 2013/0021352 A1* | 1/2013 | Wyatt | G09G 5/395 345/520 |
| 2013/0235014 A1 | 9/2013 | Lee et al. | |
| 2013/0235055 A1* | 9/2013 | Kim | G09G 5/006 345/545 |
| 2014/0176586 A1 | 6/2014 | Gruber et al. | |
| 2014/0253537 A1 | 9/2014 | Lee et al. | |
| 2014/0281035 A1 | 9/2014 | Harrison et al. | |
| 2016/0180796 A1* | 6/2016 | Morein | G06T 11/60 345/629 |

* cited by examiner

DEVICES AND METHODS FOR OPERATING A TIMING CONTROLLER OF A DISPLAY

BACKGROUND

The present disclosure relates generally to electronic displays, and more particularly, to reducing power consumption of timing controllers and buffers of electronic displays.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including consumer electronics such as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery powered devices or in other contexts where it is desirable to minimize power usage.

Typically, LCDs may also include an array of pixels for displaying images. Image data related to each pixel may be sent by a processor to the LCD panel through a timing controller (TCON) and data driver. The TCON and the data driver may then process the image data and transmit corresponding voltage signals to the individual pixels. Certain LCDs may include a panel self refresh (PSR) feature, which operates according to a method described as "burst frame update." When operating an LCD according to this method, the processor may continuously generate and transmit frames of image data. The frames of image data may pass through the TCON and a frame buffer of the LCD, as each frame of data is written to, and read from the frame buffer. Thus, operating LCDs according to the PSR feature may consume substantial power. It may be useful to provide an LCD that reduces power consumption.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Methods and devices for reducing the power consumption of a frame buffer and timing controller of an electronic display are provided. By way of example, a method of operating an electronic display includes receiving image data from a processor of the electronic display, storing the image data to a buffer of the electronic display, reading the image data from the buffer to supply the image data to a column driver of the electronic display, determining whether an amount of image data stored in buffer is less than a threshold, and switching from reading the image data from the buffer to reading the image data directly from the processor when the amount of image data stored in buffer is less than the threshold.

BRIEF DESCRIPTION OF THE DRAWINGS

Various aspects of this disclosure may be better understood upon reading the following detailed description and upon reference to the drawings in which.

DETAILED DESCRIPTION

Figure 1:
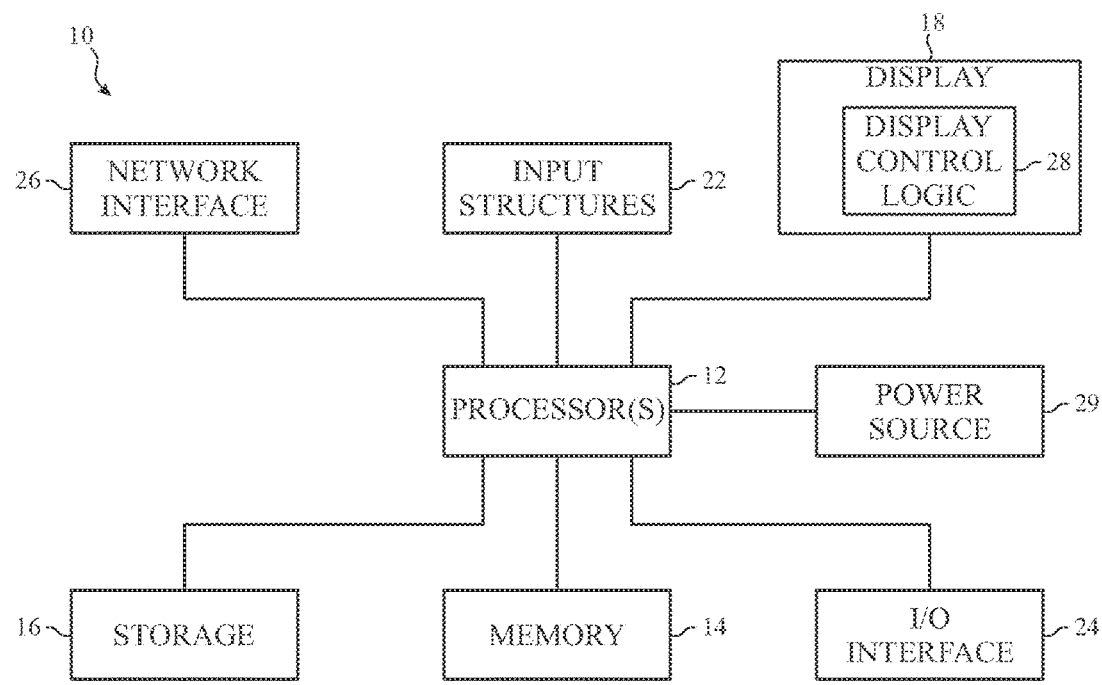
FIG. 1 is a schematic block diagram of an electronic device including display control circuitry, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments relate to techniques for reducing the power consumption of a frame buffer and timing controller (TCON) of an electronic display and device. In certain embodiments, control logic of the TCON may cause the TCON to read image data from the frame buffer until such a point that the frame buffer becomes approximately empty (e.g., substantially less than full or less than a configurable threshold) when operating in a panel self refresh (PSR) mode. Specifically, the control logic of the TCON may cause the TCON to read the image data from the frame buffer until a threshold number of frames or a data capacity threshold (e.g., a minimum data storage capacity) is reached as part of the PSR mode. For example, as the TCON writes (e.g., stores) frames of image data into the frame buffer, the frames of image data may substantially immediately start to be read out of the frame buffer by the TCON. Specifically, in some embodiments, the TCON may begin to adjust the frame timing over the course of a number frames of image data such that the time at which a frame of image data is read from the buffer is synchronized with the time at which the start of a frame of image data is received from an image data generating source.

Once the threshold number of frames, a data capacity threshold is reached, or when the time at which the start of a frame of image data is read from the buffer 8 is within a programmable threshold of the time at which the start of a frame of image data is received from the image data generating source, the control logic of the TCON may then cause the TCON to switch from reading frames of image data from the frame buffer (e.g., switch from operating in the PSR mode) to reading frames of image data directly from the live stream of incoming image data provided by an image data generating source. That is, instead of reading the image data from the frame buffer of the TCON, and then transmitting the output image data to the column driver of the electronic display, the incoming image data received via the TCON may be transmitted directly to the column driver. However, even while the incoming image data received via the TCON may be transmitted directly to the column driver, the incoming image data may also continue to be stored to the frame buffer in parallel operations. Thus, once the image data generating source ceases sending image data updates to the TCON, and, by extension, the TCON is instructed to return to operating in the PSR mode, the TCON may dynamically switch back to reading the frames of image data from the frame buffer. In this way, power consumption of the frame buffer and the TCON may be reduced, and, by extension, the overall power consumption of the electronic display and device may be reduced.

With these features in mind, a general description of suitable electronic devices useful in reducing the power consumption of a frame buffer and timing controller of an electronic display is provided. Turning first to FIG. 1, an electronic device 10 according to an embodiment of the present disclosure may include, among other things, one or more processor(s) 12, memory 14, nonvolatile storage 16, a display 18 (and display control logic 28), input structures 22, an input/output (e.g., I/O) interface 24, network interfaces 26, and a power source 29. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

Figure 2:
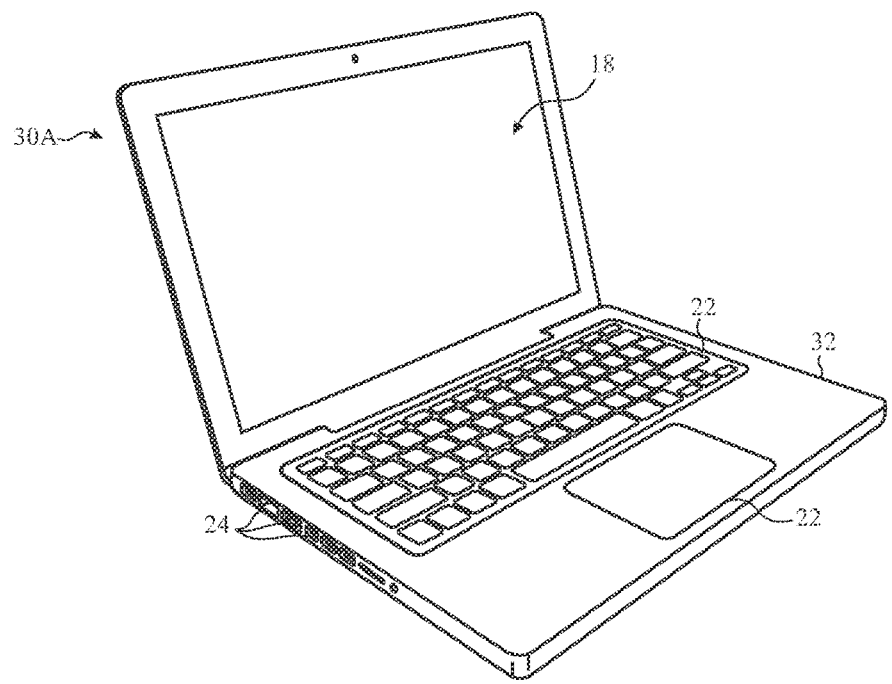
FIG. 2 is a perspective view of a notebook computer representing an embodiment of the electronic device of FIG. 1, in accordance with an embodiment.
Figure 3:
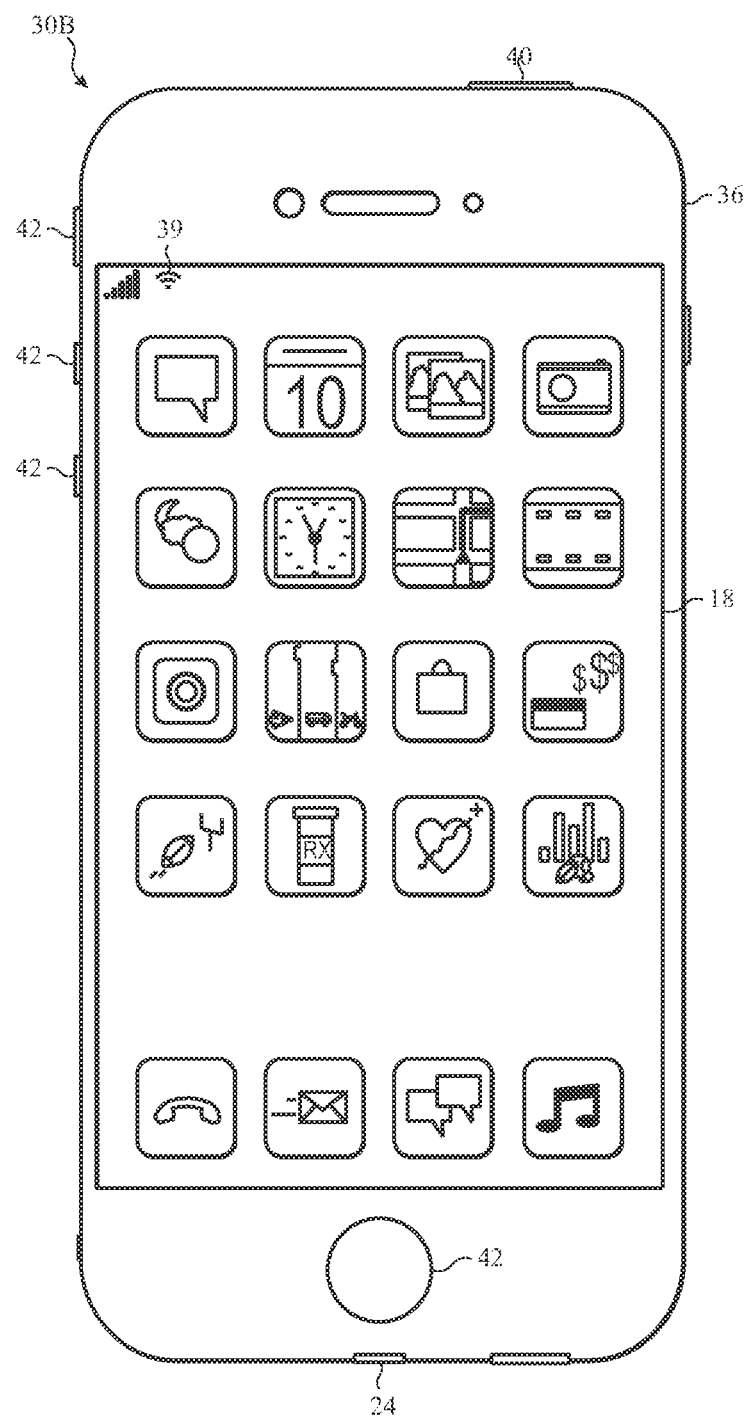
FIG. 3 is a front view of a hand-held device representing another embodiment of the electronic device of FIG. 1, in accordance with an embodiment.
Figure 4:
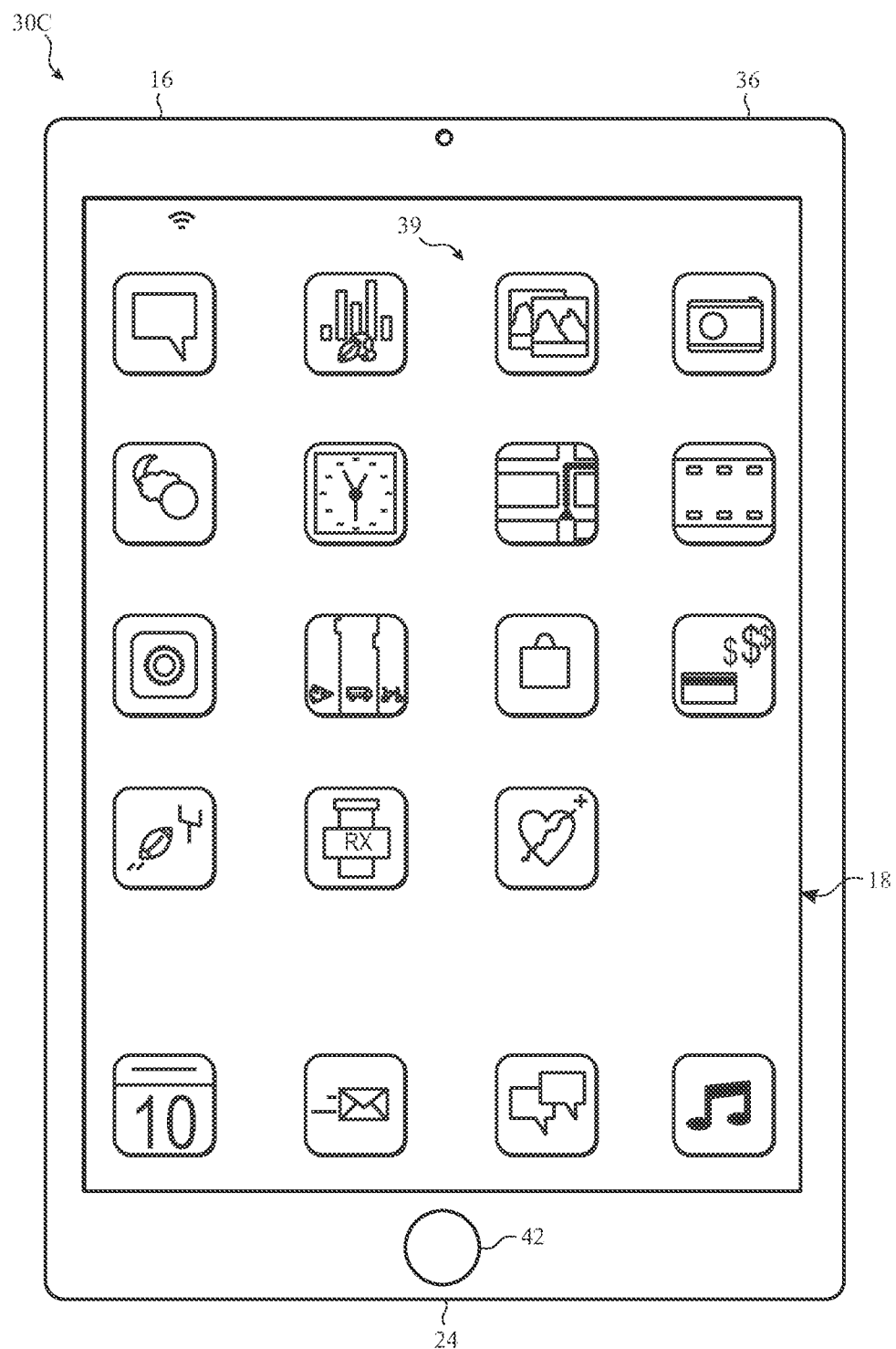
FIG. 4 is a front view of another hand-held device representing another embodiment of the electronic device of FIG. 1, in accordance with an embodiment.
Figure 5:
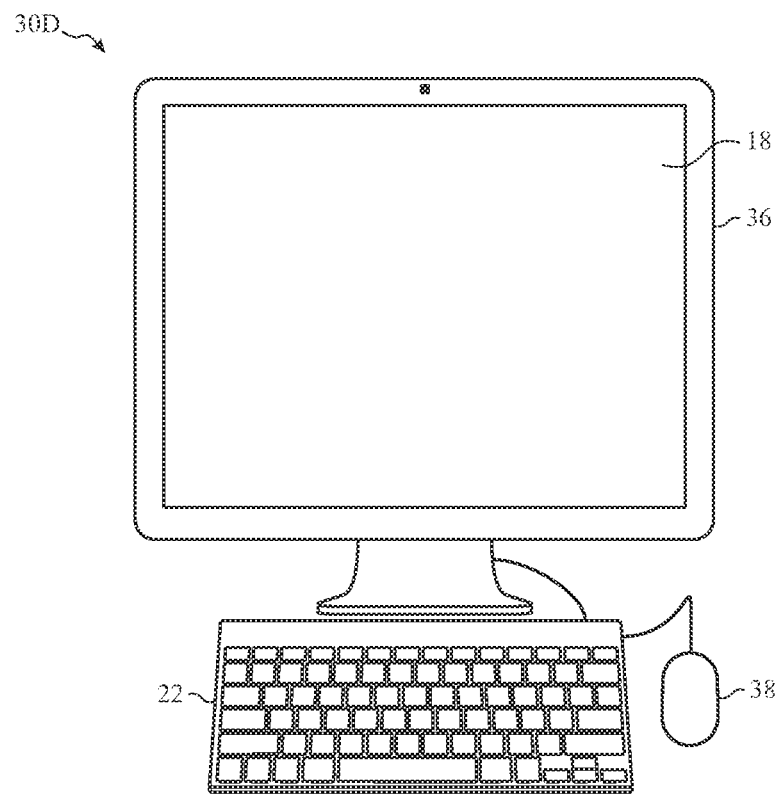
FIG. 5 is a front view of a desktop computer representing another embodiment of the electronic device of FIG. 1, in accordance with an embodiment.
Figure 6:
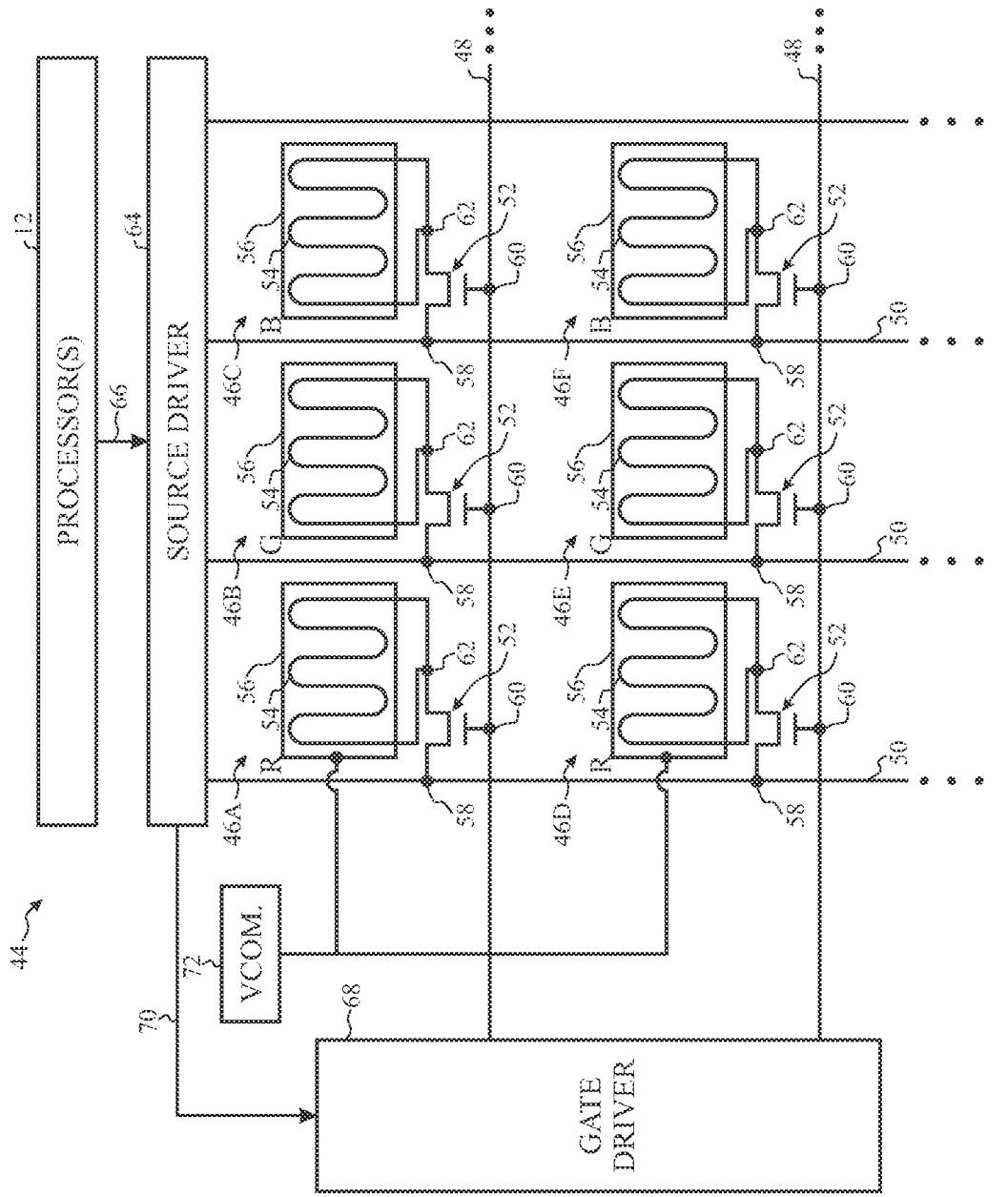
FIG. 6 is a schematic diagram of display components of an electronic display, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (e.g., OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (e.g., PAN), such as a Bluetooth network, for a local area network (e.g., LAN) or wireless local area network (e.g., WLAN), such as an 802.11x Wi-Fi network, and/or for a wide area network (e.g., WAN), such as a $3^{rd}$ generation (e.g., 3G) cellular network, $4^{th}$ generation (e.g., 4G) cellular network, or long term evolution (e.g., LTE) cellular network. The network interface 26 may also include interfaces for, for example, broadband fixed wireless access networks (e.g., WiMAX), mobile broadband Wireless networks (e.g., mobile WiMAX), and so forth. As further illustrated, the electronic device 10 may include a power source 29. The power source 29 may include any suitable source of power, such as a rechargeable lithium polymer (e.g., Li-poly) battery and/or an alternating current (e.g., AC) power converter.

In certain embodiments, the internal components of the display 18 may include display control logic 28. The display control logic 28 may be coupled to display 18 and to the processor(s) 12 and may be included as part of the display 18 panel. The display control logic 28 may be used to receive a data stream, for example, from processor(s) 12, indicative of an image to be represented on display 18. The display control logic 28 may be an application specific integrated circuit (e.g., ASIC), or any other circuitry for adjusting image data and/or generate images on display 18. For example, in certain embodiments, the display control logic 28 may receive a data stream equivalent to 24 bits of data for each pixel of display 18, with 8-bits of the data stream corresponding to a level for each of the primary colors of red, blue, and green for each sub-pixel. The display control logic 28 may operate to convert these 24 bits of data for each pixel of display 18 to 18-bits of data for each pixel of display 18, that is, 6-bits of the data stream corresponding to a level for each of the primary colors of red, blue, and green for each sub-pixel. This conversion may, for example, include removal of the two least significant bits of each of the 8-bits of the data stream corresponding to a level for each of the primary colors of red, blue, and green. Alternatively, the conversion may, for example, include a look-up table or other means for determining which 6-bit data value should correspond to each 8-bit data input.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 22, and ports of an I/O interface 24. In one embodiment, the input structures 22 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 39 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (e.g., USB), or other similar connector and protocol.

User input structures 40 and 42, in combination with the display 18, may allow a user to control the handheld device 30B. For example, the input structure 40 may activate or deactivate the handheld device 30B, one of the input structures 42 may navigate user interface to a home screen, a user-configurable application screen, and/or activate a voice-recognition feature of the handheld device 30B, while other of the input structures 42 may provide volume control, or may toggle between vibrate and ring modes. Additional input structures 42 may also include a microphone may obtain a user's voice for various voice-related features, and a speaker to allow for audio playback and/or certain phone capabilities. The input structures 42 may also include a headphone input to provide a connection to external speakers and/or headphones.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 36 may be provided to protect and enclose internal components of the computer 30D such as the dual-layer display 18. In certain embodiments, a user of the computer 30D may interact with the computer 30D using various peripheral input devices, such as the keyboard 22 or mouse 38, which may connect to the computer 30D via a wired and/or wireless I/O interface 24.

Turning now to FIG. 6, which generally represents a circuit diagram of certain components of the display 18 in accordance with some embodiments. In particular, the pixel array 44 of the display 18 may include a number of unit pixels 46 disposed in a pixel array or matrix. In such an array, each unit pixel 46 may be defined by the intersection of rows and columns, represented by gate lines 48 (also referred to as scanning lines), and data lines 50 (also referred to as data lines), respectively. Although only 6 unit pixels 46, referred to individually by the reference numbers 46A-46F, respectively, are shown for purposes of simplicity, it should be understood that in an actual implementation, each data line 50 and gate line 48 may include hundreds or thousands of such unit pixels 46. Each of the unit pixels 46 may represent one of three subpixels that respectively filters only one color (e.g., red, blue, or green) of light through, for example, a color filter. For purposes of the present disclosure, the terms "pixel," "subpixel," and "unit pixel" may be used largely interchangeably.

In the presently illustrated embodiment, each unit pixel 46 may include a thin film transistor (TFT) 52 for switching a data signal stored on a respective pixel electrode 54. The potential stored on the pixel electrode 54 relative to a potential of a common electrode 56 (e.g., creating a liquid crystal capacitance $C_{LC}$), which may be shared by other pixels 46, may generate an electrical field sufficient to alter the arrangement of liquid crystal molecules (not illustrated in FIG. 6). In the illustrated embodiment of FIG. 6, a source 58 of each TFT 52 may be electrically connected to a data line 50 and a gate 60 of each TFT 52 may be electrically connected to a gate line 48. A drain 62 of each TFT 52 may be electrically connected to a respective pixel electrode 54. Each TFT 52 may serve as a switching element that may be activated and deactivated (e.g., turned "ON" and turned "OFF") for a predetermined period of time based on the respective presence or absence of a scanning signal on the gate lines 48 that are applied to the gates 60 of the TFTs 52.

When activated, a TFT 52 may store the image signals received via the respective data line 50 as a charge upon its corresponding pixel electrode 54. As noted above, the image signals stored by the pixel electrode 54 may be used to generate an electrical field between the respective pixel electrode 54 and a common electrode 56. This electrical field may align the liquid crystal molecules to modulate light transmission through the pixel 46. Furthermore, although not illustrated, it should be appreciated that each unit pixel 46 may also include a storage capacitor $C_{ST}$ that may used to sustain the pixel electrode voltage (e.g., $V_{pixel}$) during the time in which the TFTs 52 may be switch to the "OFF" state.

In certain embodiments, the display 18 also may include a source driver integrated circuit (IC) 64, which may include a chip, such as a processor or application specific integrated circuit (ASIC) that controls the display pixel array 44 by receiving image data 66 from the processor(s) 12, and sending corresponding image signals to the unit pixels 46 of the pixel array 44. The source driver 64 may also provide timing signals 70 to the gate driver 68 to facilitate the activation/deactivation of individual rows of pixels 46. In other embodiments, timing information may be provided to the gate driver 68 in some other manner. The display 18 may or may not include a common voltage (VCOM) source 72 to provide a common voltage (VCOM) voltage to the common electrodes 56. In certain embodiments, the VCOM source 72 may supply a different VCOM to different common electrodes 56 at different times. In other embodiments, the common electrodes 56 all may be maintained at the same potential or similar potential.

Figure 7:
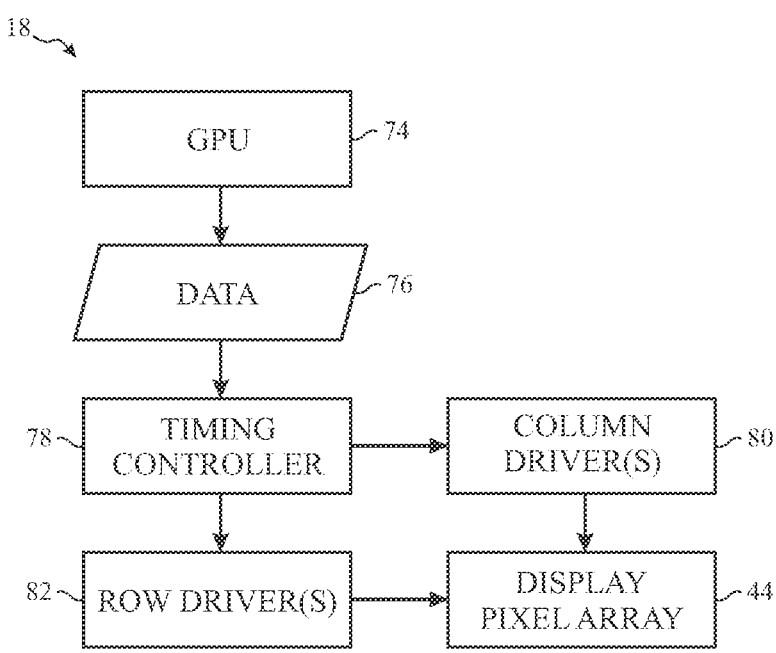
FIG. 7 is a block diagram representative of how the LCD of FIG. 6 receives data and drives a pixel array of the LCD in accordance with aspects of the present disclosure.

In certain embodiments, the display 18 may include certain additional components for processing image data and rendering images on the display 18. For example, as illustrated in FIG. 7, the display 18 may include a graphics processing unit (GPU) 74 or other similar image processing and/or image data generating device that may be useful in generating and transmitting data 76 to a timing controller (TCON) 78 of the display 18. In some embodiments, the GPU 74 may be included as part of the one or more processor(s) 12. The data 76 may generally include any image data (e.g., still image data, video image data) that may be processed by circuitry of the display 18 to drive the pixels 46 of, and render one or more images on, the display 18. The TCON 78 may be used to transmit signals to, and control the operation of, one or more column drivers 80 (e.g., source driver 64 as discussed above with respect to FIG. 6) and one or more row drivers 82 (e.g., gate driver 68 as discussed above with respect to FIG. 6). The column driver 80 and row driver 82 may generate analog signals for driving the number of pixels 46 of the pixel array 44.

In certain embodiments, the TCON 78 may generate and transmit data and timing signals (e.g., clock signals, vertical synchronization signals [V-Sync], horizontal synchronization signals [H-Sync], and so forth) for biasing, synchronizing, and/or controlling the operation of the column driver 80 and the row driver 82. As will be further appreciated, the TCON 78 may be used to reduce power consumption during image data frame updates (e.g., long burst frame updates) when operating the display 18 in the PSR mode.

Figure 8:
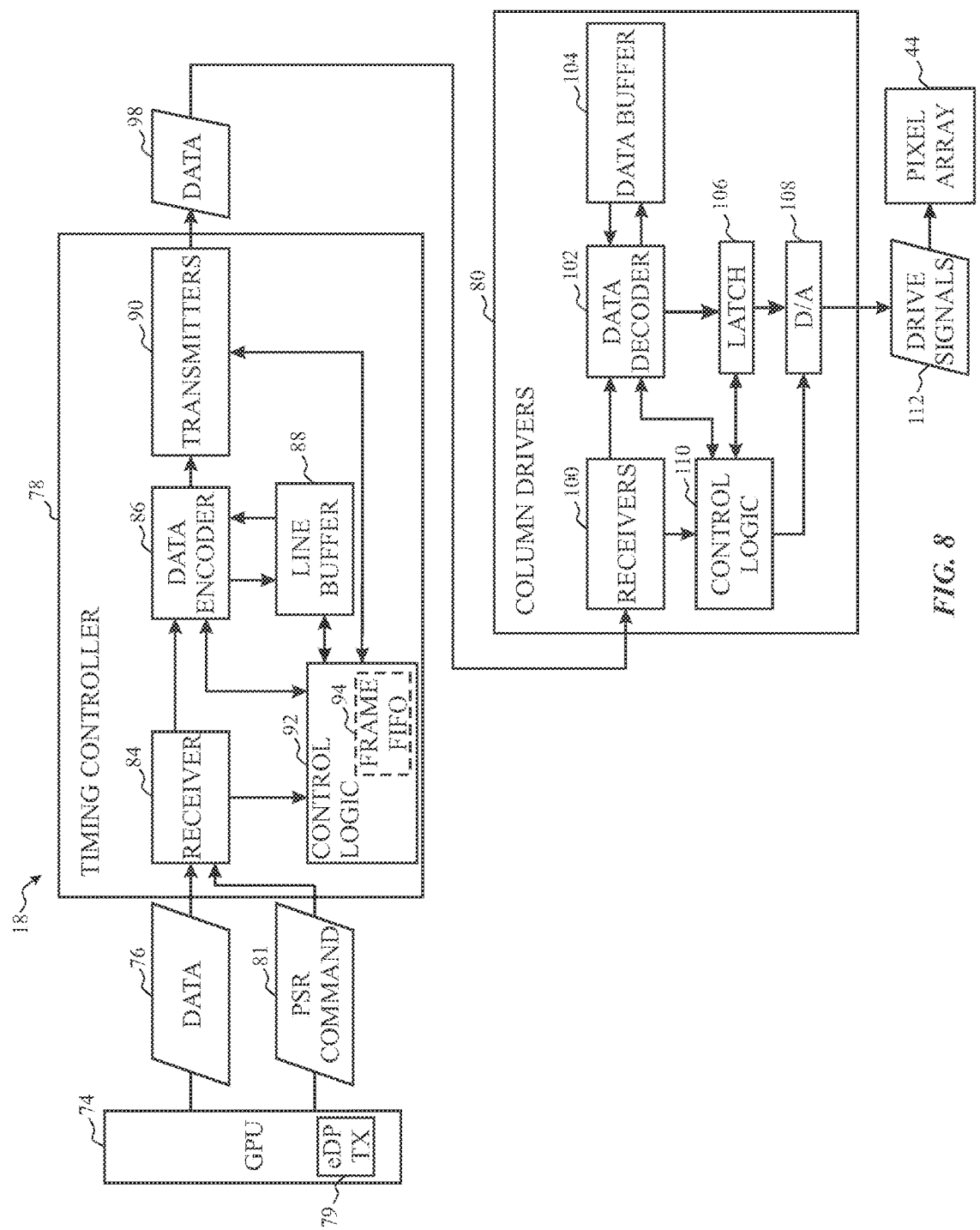
FIG. 8 is a block diagram generally depicting functional circuit components of the timing controller and column driver of FIG. 7 in accordance, in accordance with an embodiment.

For example, referring now to FIG. 8, in certain embodiments, the TCON 78 may include a receiver 84 for receiving image data 76 (e.g., frames of image data or video pixel data). As illustrated, the image data 76 may be provided to the TCON 78 by the GPU 74 or, in other embodiments, the processor(s) 12 or some other image data generating source. In some embodiments, the GPU 74 may include an Embedded DisplayPort (eDP™) transmitter 79 that may be used to provide the image data 76, a PSR command 81 to the TCON 78, and/or other similar display 18 information. Specifically, as previously noted, the PSR command 81 may include instructions to cause the TCON 78 to operate in the PSR mode, in which the GPU 74 may continuously transmit the image data 76 to the TCON 78 via a receiver 84 of the TCON 78. In some embodiments, the image data 76 generated and transmitted by the GPU 74 and received via the receiver 84 may be written to a line buffer 88 of the TCON 78. The line buffer 88 may include a remote frame buffer (RFB), or any of various buffers (e.g., frame buffers).

In certain embodiments, the TCON 78 may also include a data encoder 86 that may operate with the line buffer 88 to process the image data 76 and output image data 98 (e.g., frames of image data or video pixel data) for transmission to the column driver 80 via transmitters 90. In one embodiment, the output image data 98 may be the same as the input image data 76 or may include encoded data representative of the input image data 76. The output image data 98 may also include timing signals (e.g., clock signals, V-Sync signals, H-Sync signals, and so forth). As further illustrated, the TCON 78 may include control logic 92 for coordinating and controlling operations of the various components of the TCON 78. As will be further appreciated, the control logic 92 may control the TCON 78 to dynamically switch between operating in the PSR mode in which the TCON 78 stores to and reads image data 76 from the line buffer 88 and operating in an alternative mode in which the TCON 78 reads and transmits the image data 76 directly to the column driver 80 as it is received from the GPU 74 (e.g., a mode in which the TCON 78 does not read the image data 76 from the line buffer 88) while storing the image data 76 to the line buffer 88.

As further depicted by FIG. 8, the TCON 78 may transmit the output image data 98 to receivers 100 of the column driver 80. The column driver 80 may also include a data decoder 102 for decoding or otherwise processing the image data 98 and writing data values to a latch 106. The column driver 80 may include a data buffer 104 that may temporarily store decoded data to facilitate writing of data values to the latch 106. The encoded image data 98 may generally include data values that may be converted into drive signals for the pixel array 44. The data decoder 130 may write (e.g., store) such values to the latch 134. The image data values may be then converted via digital-to-analog conversion (DAC) circuitry 108 to analog drive signals 112 and applied to the various pixels 46 of the pixel array 44. The column driver 80 may also include control logic 110 that may be used to control operation of the column driver 80.

In certain embodiments, as previously noted, the image data 76 generated and transmitted by the GPU 74 and received via the receiver 84 may be written to (e.g., stored into) and read from (e.g., transferred out) to the line buffer 88. Specifically, as noted above, in the PSR mode, the GPU 74 may continuously transmit the image data 76, which may in turn continuously pass through the line buffer 88 of the TCON 78. However, as it may be appreciated, continuously writing frames of image data 76 to the line buffer 88 and reading frames of image data 76 from the line buffer 88 through may increase the power consumption of the display 18 and associated components (e.g., line buffer 88, TCON 78), and by extension, the electronic device 10.

Accordingly, in certain embodiments, it may be useful to provide the TCON 78 including the control logic 92 and a frame first-in-first-out (FIFO) block 94 that may be used to markedly increase the readout time of the line buffer 88 to reduce power consumption during image data frame updates (e.g., long burst frame updates) when the TCON 78 performs panel self refresh (PSR) of the pixels 46, and further to allow the TCON 78 to dynamically switch between operating in the PSR and operating in an alternative mode in which the TCON 78 reads and transmits the image data 76 directly to the column driver 80 as it is received from the GPU 74 (e.g., a mode in which the TCON 78 does not read the image data 76 from the line buffer 88). For example, in certain embodiments, the frame FIFO block 94 may include a queue or other system (e.g., a number of registers or a software storage management system) that may be utilized to manage the storage of the image data 76 in the line buffer 88. The frame FIFO block 94 may allow frames of image data 76 to be read out from the line buffer 88 on a first in first out basis. Thus, the frames of image data 76 may be transmitted in the order they were received from the GPU 74. Specifically, in one or more embodiments, the frame FIFO block 94 may utilize precession (e.g., a conical rotation of the image data 76 or frames of the image data 76) to increase the readout speed and efficiency of the line buffer 88 when refreshing the pixels 46 in the PSR mode.

For example, in certain embodiments, when the TCON 78 is operating in the PSR mode, and is thus generating its own frame timing and reading image data 76 from the line buffer 88, the TCON 78 may write (e.g., store) the image data 76 received from the GPU 74 into the line buffer 88 and read image data 76 data from the line buffer 88 once the GPU 74 begins again sending image data 76 updates to the TCON 78. The TCON 78 may then begin to adjust the frame timing over the course of a number frames of image data 76 such that the time at which a frame of image data 76 is read from the line buffer 88 is synchronized with the time at which the start of a frame of image data 76 is received from the GPU 74.

In certain embodiments, the control logic 92 of the TCON 78 may cause the TCON 78 to read the image data 76 from the line buffer 88 until such a point as the line buffer 88 is approximately empty (e.g., substantially less than full or less than a configurable threshold). Specifically, the control logic 92 of the TCON 78 may cause the TCON 78 to read the image data 76 from the line buffer 88 until a threshold number of frames or a data capacity threshold (e.g., a minimum data storage capacity) is reached. Thus, in this way, as frames of image data 76 begin being written into the line buffer 88 during the PSR mode, the frames of image data 76 may substantially immediately start to be read out of the line buffer 88 by the TCON 78.

Once the threshold number of frames or the data capacity threshold (e.g., a minimum data storage capacity) is reached, the control logic 92 of the TCON 78 may then cause the TCON 78 to switch from reading frames of image data 76 from the line buffer 88 to reading frames of image data 76 from the live stream of image data 76 provided by the GPU 74. That is, as opposed to reading the image data 76 from the line buffer 88 of the TCON 78, and then transmitting the output image data 98 to the column driver 80, the incoming image data received via the receiver 84 may be encoded via the data encoder 86 and transmitted (e.g., via the transmitter 90) to the column driver 80. However, it should be appreciated that even while operating in the mode in which the incoming image data 76 received via the TCON 78 may be transmitted directly to the column driver 80, the incoming image data 76 may also continue to be stored to the line buffer 88 in parallel (e.g. concurrently). Thus, once the GPU 74 ceases sending the image data 76 updates, the TCON 78 may dynamically switch back to reading the frames of image data 76 from the line buffer 88.

In another embodiment, when the time at which the start of a frame of image data 76 is read from the line buffer 88 is within a programmable threshold (e.g., a threshold time period) of the time at which the start of a frame of image data 76 is received from the GPU 74 (e.g., when the TCON 78 is still in the PSR mode), the TCON 78 may then determine to drive the column driver 80 utilizing the image data 76 received from the GPU 74 rather than utilizing the image data 76 read from the line buffer 88. In these ways, power consumption of the line buffer 88 and the TCON 78 may be reduced, and, by extension, the overall power consumption of the electronic device 10 may be reduced.

In certain other embodiments, in which the display 18 may operate according to a media buffer optimization (MBO) mode of operation, in which all frames of the image data 76 may pass through the line buffer 88 for relatively long periods of time (e.g., as compared to the previously discussed modes of operation), the control logic 92 of the TCON 78 may synchronize the timing of the frames of image data 76 being stored to and read from the line buffer 88 with the timing of the image data 76 being received by the TCON 78 from the GPU 74. Indeed, by synchronizing the frames of image data 76 being stored to and read from the line buffer 88 with the image data 76 being received by the TCON 78 from the GPU 74, the TCON 78 may be allowed to read the image data 76 directly from the GPU 74 rather than from the line buffer 88. In one embodiment, when operating the display 18 in the MBO mode of operation, the control logic 92 of the TCON 78 may instruct or control the TCON 78 to not store the frames of image data 76 to the line buffer 88 at all, and thus may allow even greater reduction in power consumption of the line buffer 88 and the TCON 78.

Figure 9:
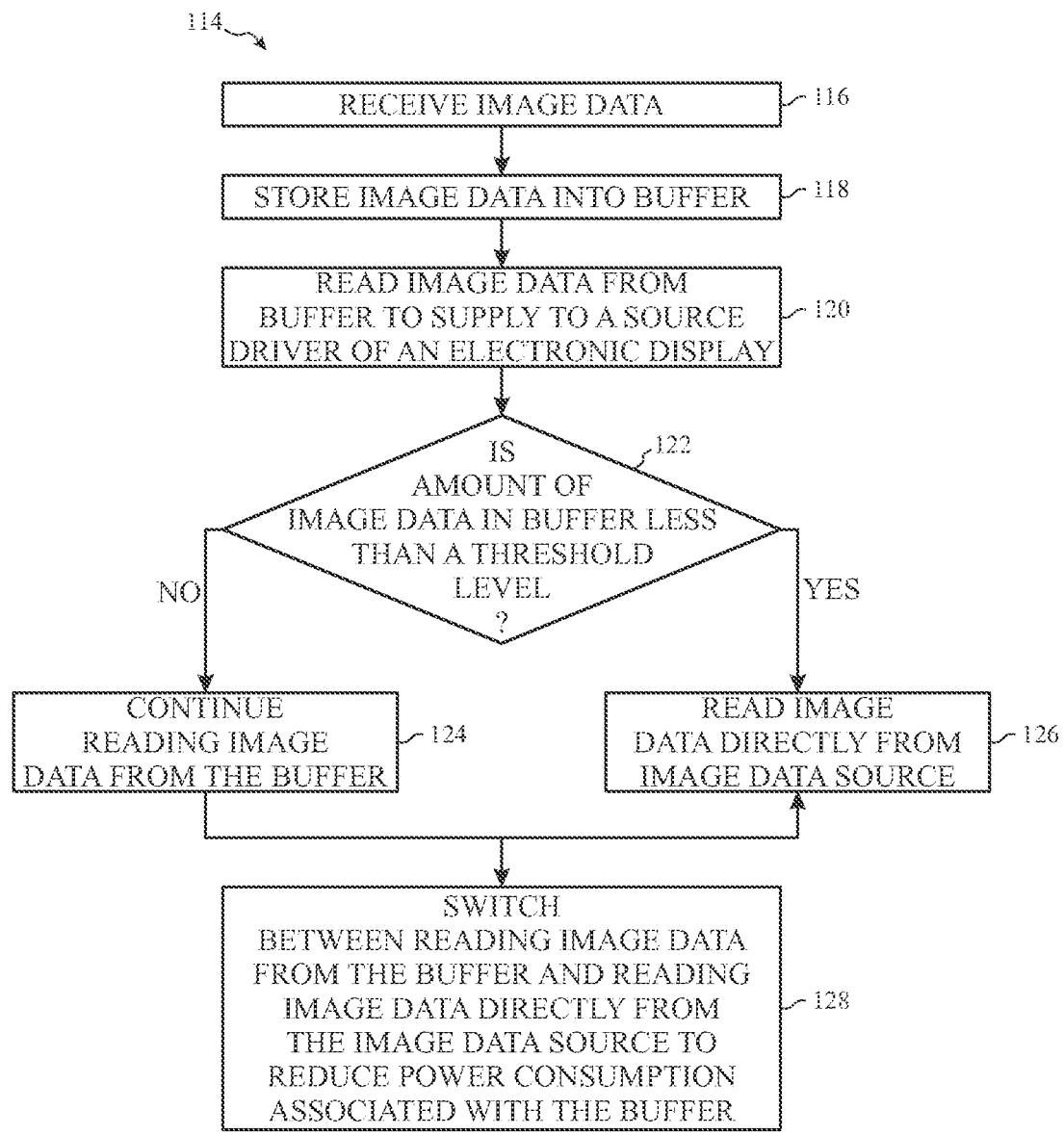
FIG. 9 is a flow diagram illustrating an embodiment of a process useful in reducing the power consumption of a frame buffer and timing controller of the electronic display, in accordance with an embodiment.

Turning now to FIG. 9, a flow diagram is presented, illustrating an embodiment of a process 114 useful in reducing the power consumption of a frame buffer and timing controller of an electronic display by using, for example, one or more the processor(s) 12 or timing controller circuitry (e.g., TCON 78) depicted in FIGS. 1 and 8. The process 114 may include code or instructions stored in a non-transitory machine-readable medium (e.g., the memory 14) and executed, for example, by the one or more processor(s) 12 and/or TCON 78. The process 114 may begin with the TCON 78 receiving (block 116) image data (e.g., frames of image data 76). The process 114 may continue with the TCON 78 storing (block 118) the image data into a buffer. For example, the TCON 78 may receive frames of image data 76, and stored the frames of image data 76 into a line buffer 88. The process 114 may then continue with the TCON 78 reading (block 120) the image data from the buffer to supply to a source driver of an electronic display. For example, as noted above, the TCON 78 may read the frames of image data 76 from the line buffer 88, and supply the frames of image data 76 to the column driver 80 when operating in the PSR mode.

The process 114 may then continue with the TCON 78 determining (decision 122) whether the amount of image data in the buffer is less than a threshold level. If the amount of image data in the buffer is not less than the threshold level, the process 114 may then continue with the TCON 78 continuing (block 124) to read the image data from the buffer. For example, as discussed above with respect to FIG. 8, the control logic 92 of the TCON 78 may cause the TCON 78 to read the image data 76 from the line buffer 88 until a threshold number of frames or a data capacity threshold is reached. On the other hand, if the amount of image data in the buffer is less than the threshold level, the process 114 may then continue with the TCON 78 reading (block 126) image data directly from the image data source.

For example, once the TCON 78 determines that the line buffer 88 is approximately empty (e.g., substantially less than full or less than a configurable threshold), the TCON 78 may begin reading the incoming image data 76 directly received from the GPU 74 (e.g., as opposed to reading the image data 76 from the line buffer 88), and supplying the output image data 98 directly to the column driver 80. In some embodiments, when the time at which the start of a frame of image data 76 is read from the line buffer 88 is within a programmable threshold (e.g., a threshold time period) of the time at which the start of a frame of image data 76 is received from the GPU 74, the TCON 78 may then determine to drive the column driver 80 utilizing the image data 76 received from the GPU 74 rather than utilizing the image data 76 read from the line buffer 88.

The process 114 may then conclude with the TCON 78 (block 128) switching between reading the image data from the buffer and reading the image data directly from the image data source to reduce power consumption associated with the TCON and/or the buffer. Specifically, as previously noted, as opposed to reading the image data 76 from the line buffer 88 of the TCON 78, and then transmitting the output image data 98 to the column driver 80, the incoming image data 76 received via the receiver 84 may be encoded via the data encoder 86 and transmitted (e.g., via the transmitter 90) directly to the column driver 80.

However, it should again be appreciated that even when the incoming image data 76 received via the TCON 78 is transmitted directly to the column driver 80, the incoming image data 76 may also continue to be stored to the line buffer 88 in a parallel operation (e.g. concurrently). Indeed, in some embodiments, the TCON 78 may begin to adjust the frame timing over the course of a number frames of image data 76 such that the time at which a frame of image data 76 is read from the line buffer 88 is synchronized with the time at which the start of a frame of image data 76 is received from the GPU 74. Once the GPU 74 ceases sending image data 76 updates to the TCON 78, and, by extension, the TCON 78 is instructed to return to operating in the PSR mode, the TCON 78 may dynamically switch back to reading the frames of image data 76 from the line buffer 88. In this way, power consumption of the line buffer 88 and the TCON 78 may be reduced, and, by extension, the overall power consumption of the electronic device 10 may be reduced.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
a processor configured to generate image data; and
a display comprising a buffer, wherein the display is communicatively coupled to the processor and configured to receive the image data from the processor and to display an image based on the image data received from the processor, wherein the display is configured to dynamically switch from reading the image data from a first path through the buffer to reading the image data from a second path separate from the buffer based at least in part on whether a total amount of image data stored in the buffer is less than a threshold level of the buffer, wherein the display is configured to store the image data to the buffer along the first path concurrently while reading the image data from the second path.

2. The electronic device of claim 1, wherein the display is configured to receive a panel self refresh (PSR) signal as an indication to operate in a PSR mode.

3. The electronic device of claim 2, wherein, in the PSR mode, the display is configured to read the image data from the buffer.

4. The electronic device of claim 1, wherein the display is configured to read the image data from the first path when the amount of image data stored in the buffer is greater than the threshold level.

5. The electronic device of claim 1, wherein the display is configured to read the image data from the second path when the amount of image data stored in the buffer is less than or equal to the threshold level.

6. The electronic device of claim 1, wherein the display is configured to read the image data directly from an image data source as the second data path.

7. The electronic device of claim 1, wherein the display reads images directly from the image data source when the total amount of image data stored in the buffer is less than a threshold level of the buffer.

8. An electronic display, comprising:
a display panel comprising an array of pixels configured to receive pixel data signals; and
a timing controller (TCON) configured to receive pixel data from a pixel data generating source and to send signals corresponding to pixel data to the display panel, wherein the TCON is configured to store the received pixel data to a buffer and to read the pixel data from the buffer along a first path in a first mode of operation, and to read the pixel data directly from the pixel data generating source along a second path in a second mode of operation, and wherein the TCON is configured to switch from the first mode of operation to the second mode of operation based at least in part on whether a total amount of pixel data stored in the buffer is less than a threshold level of the buffer, wherein the TCON is configured to store the image data to the buffer along the first path concurrently while reading the image data from the second path.

9. The electronic display of claim 8, wherein the TCON comprises the buffer and control logic, and wherein the control logic is configured to monitor a storage capacity of the buffer.

10. The electronic display of claim 8, wherein the buffer comprises a line buffer.

11. The electronic display of claim 8, wherein the buffer comprises a remote frame buffer (RFB).

12. The electronic display of claim 8, wherein the TCON comprises control logic, and wherein the control logic is configured to utilize a frame first-in-first-out (FIFO) technique to increase a readout efficiency of the buffer during the first mode of operation.

13. The electronic display of claim 8, wherein the TCON is configured to operate in the first mode of operation when the total amount of pixel data stored in the buffer is greater than the threshold level.

14. The electronic display of claim 8, wherein the TCON is configured to operate in the second mode of operation when the total amount of pixel data stored in the buffer is less than or equal to the threshold level.

15. The electronic display of claim 8, wherein the TCON is configured to read the pixel data directly from the pixel data generating source when the total amount of pixel data stored in the buffer is less than a threshold level of the buffer.

16. A method of operating an electronic display, comprising:
  receiving image data from a processor of the electronic display;
  storing the received image data to a buffer of a timing controller (TCON) of the electronic display;
  reading the image data from the buffer to supply the image data to a column driver of the electronic display;
  determining whether a total amount of image data stored in the buffer is less than a threshold; and
  switching a mode of operation of the TCON from reading the image data from the buffer along a first path to reading the image data directly from the processor along a second path when the amount of image data stored in the buffer is less than the threshold, wherein the TCON stores the image data to the buffer along the first path concurrently while reading the image data from the second path.

17. The method of claim 16, comprising continuing to read the image data from the buffer when the amount of image data stored in the buffer is greater than the threshold.

18. The method of claim 16, comprising switching from reading the image data directly from the processor back to reading the image data from the buffer when the electronic display ceases receiving image data from the processor.

19. An electronic device, comprising:
  a processor configured to:
  receive image data;
  store the received image data to a remote frame buffer (RFB) of the electronic device;
  retrieve the image data from the RFB to provide to a display panel of the electronic device until the RFB is substantially empty; and
  when the RFB is substantially empty, switch from retrieving the image data from the RFB to the display panel to providing the image data directly to the display panel upon receipt of the image data, wherein the RFB is substantially empty when a total number of frames of the image data stored in the RFB is less than a threshold number of frames of image data.

20. The electronic device of claim 19, wherein the display panel is communicatively coupled to the processor and configured to receive the image data from the processor to display an image based thereon.

21. The electronic device of claim 19, wherein the RFB is substantially empty when a total amount of the image data stored to the RFB is less than a minimum storage capacity of the RFB.

22. The electronic device of claim 19, wherein the processor is configured to switch back to retrieving the image data from the RFB in between periods of receiving the image data.

* * * * *